UNITED STATES PATENT OFFICE.

JOHN YOUNG, OF AKRON, AND WINTHROP W. BENNER, OF CUYAHOGA FALLS, OHIO, ASSIGNORS TO THE FIRESTONE TIRE AND RUBBER COMPANY, OF AKRON, OHIO, A CORPORATION OF OHIO.

PROCESS OF RECLAIMING RUBBER.

1,324,093.     Specification of Letters Patent.     Patented Dec. 9, 1919.

No Drawing.     Application filed April 4, 1918. Serial No. 226,744.

*To all whom it may concern:*

Be it known that we, JOHN YOUNG and WINTHROP W. BENNER, both subjects of the King of Great Britain, residing at Akron and Cuyahoga Falls, respectively, in the county of Summit and State of Ohio, have invented certain new and useful Improvements in Processes of Reclaiming Rubber, of which the following is a specification.

Our invention relates to the reclaiming of waste vulcanized rubber and has for its principal object the restoring of rubber from such waste to a condition approximating its original unvulcanized condition and to such a condition that it can be readily reworked into rubber compounds.

In the main our process is intended as an improvement on the process of reclaiming rubber now practised under the patent to Herbert W. Kugler, No. 1,124,920, issued January 12, 1915, and for a full understanding of the process attention is directed to that patent.

The method of procedure set forth in the Kugler patent required the use of a member of the carbocyclic amido compounds such as anilin and that method of this patent produced a high-grade of reclaimed rubber, the particular characteristic being that the rubber obtained by the process of the former patent was soluble in certain well known rubber solvents in which ordinary reclaimed rubber was not soluble and also in the fact that it possessed superior aging qualities.

It was the purpose of our invention in the first place to devise a substitute for the anilin which is used in this reclaiming process, and for this purpose we proposed the use of a benzene hydrocarbon such as xylol or one of its homologues. We found, however, that the reclaimed rubber obtained by the use of xylol alone did not possess the property of aging which was one of the leading superiorities of rubber reclaimed by the anilin process. We therefore proposed to use with the xylol a certain percentage of anilin, it being our belief that the property of aging was perhaps due to a certain amount of anilin left in the reclaimed rubber, although it is not possible to positively affirm this theory.

Instead of the anilin as called for in the Kugler process, we propose to treat the vulcanized rubber scrap, in combination with the other chemicals required to devulcanize it, with a combination of anilin and xylol. We have tried various proportions of anilin and xylol and have found the following proportions to work with a large degree of success:

5 per cent. anilin, 10 per cent. xylol
5 per cent. anilin, 15 per cent. xylol
2½ per cent. anilin, 15 per cent. xylol
2½ per cent. anilin, 10 per cent. xylol.

Of the various proportions which we have tried, we have found that the last named above, that of two and one-half per cent. anilin and ten per cent. xylol, has given the best results.

We have found that a combination of anilin and xylol affords a superior agent for the purpose of devulcanizing, than either anilin or xylol by itself and the results obtained from its use are far superior to any results that might have been anticipated from the combination.

We find that by the use of our improved devulcanizing agent in the place of xylol alone, we retain the beneficial results of aging rubber devulcanized by anilin. The time required for devulcanization over the use of either anilin or xylol alone, is reduced almost fifty per cent. Considerable difficulty has been experienced heretofore in reclaiming rubber from the black rubber compounds which have lately become popular in the manufacture of automobile tire casings. The presence of the excessive quantity of lampblack which has been introduced into the tread compounds to replace zinc oxid has increased the difficulty of reclaiming rubber by the ordinary processes. We find, however, that by the use of our devulcanizing agent this character of rubber is more easily devulcanized than with the former processes. The capacity of the refining apparatus is increased over twenty-five per cent. and the tailings, by which is meant the particles of rubber which remain undevulcanized, has been reduced fifty per cent. The product is increased in tensile strength about thirty per cent., in addition to which fact the reclaimed rubber produced by this process is handled much easier in the mills and is worked back into rubber compounds with greater ease and efficiency. In this process we are enabled to recover approximately fifty per cent. of the xylol.

Although we have described xylol and anilin particularly, we do not desire to be limited to these chemical substances, as it is possible to use their equivalents or homologues with excellent results; nor are we limited to any exact proportions of anilin and xylol. As stated above, we find that two and one-half per cent. of anilin and ten per cent. of xylol give the best results, but it is possible that other proportions will give equally good results and we do not desire to be limited to any particular proportion.

It is understood that in the reclaiming of rubber by our process the usual steps of commminuting the old rubber tires or other articles to be reclaimed and the proper and suitable conditions of temperature and pressure are retained as in other reclaiming processes, particularly the Kugler process. The hydrates of alkali metals also serve as a solvent for the cotton fibers found in the waste treated by our process.

It is obvious that changes and modifications may be made in the processes set forth without departing from the spirit of the invention or sacrificing any of its benefits.

We claim:

1. The process of reclaiming vulcanized rubber, which comprises simultaneously treating the material in proper condition and under heat and pressure with a devulcanizing agent comprising xylol and anilin, in the presence of a substance capable of combining with or absorbing sulfur.

2. The process of reclaiming vulcanized rubber, which comprises simultaneously treating the material to be devulcanized under proper conditions of heat and pressure with a devulcanizing agent comprising xylol or one of its homologues and anilin or one of its homologues, in the presence of a substance capable of combining with or absorbing sulfur.

3. The process of reclaiming vulcanized rubber, which comprises simultaneously treating the material to be devulcanized under proper conditions of heat and pressure with a devulcanizing agent comprising xylol and anilin to the proportions of $2\frac{1}{2}$ per cent. of anilin and 10 per cent. of xylol, in the presence of a substance capable of combining with or absorbing sulfur.

4. The process of reclaiming rubber, in which a suitable devulcanizing agent is used in combination with a substance capable of absorbing the sulfur, the devulcanizing agent comprising xylol and anilin.

5. The process of reclaiming rubber, in which a suitable devulcanizing agent is used in combination with a substance capable of absorbing sulfur, the devulcanizing agent comprising xylol or its homologues and anilin or its homologues.

6. The process of reclaiming rubber, in which a suitable devulcanizing agent is used in combination with a substance capable of absorbing sulfur, the devulcanizing agent comprising xylol and anilin in the proportions of ten per cent. of xylol and two and one-half per cent. of anilin.

7. The process of reclaiming vulcanized rubber, which comprises simultaneously treating the material in the proper condition and under heat and pressure with a benzene hydrocarbon and a member of the carbocylic amido compounds in the presence of a substance capable of combining with or absorbing sulfur.

8. The process of reclaiming rubber, in which a suitable devulcanizing agent is used in combination with a substance capable of absorbing the sulfur, the devulcanizing agent comprising a benzene hydrocarbon and a member of the carbocyclic amido compounds.

JOHN YOUNG.
WINTHROP W. BENNER.